(12) United States Patent
Fukami et al.

(10) Patent No.: US 10,206,175 B2
(45) Date of Patent: *Feb. 12, 2019

(54) COMMUNICATIONS FABRIC WITH SPLIT PATHS FOR CONTROL AND DATA PACKETS

(71) Applicant: Apple Inc., Cupertino, CA (US)

(72) Inventors: Munetoshi Fukami, Newark, CA (US); Srinivasa R. Sridharan, San Jose, CA (US); Harshavardhan Kaushikkar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,564

(22) Filed: Nov. 20, 2017

(65) Prior Publication Data

US 2018/0077649 A1 Mar. 15, 2018

Related U.S. Application Data

(63) Continuation of application No. 14/831,438, filed on Aug. 20, 2015, now Pat. No. 9,860,841.

(51) Int. Cl.
*H04W 52/02* (2009.01)
*H04L 12/773* (2013.01)
*H04L 12/855* (2013.01)

(52) U.S. Cl.
CPC ......... *H04W 52/0251* (2013.01); *H04L 45/60* (2013.01); *H04L 47/2466* (2013.01); *Y02D 70/00* (2018.01); *Y02D 70/26* (2018.01)

(58) Field of Classification Search
CPC .............................................. H04W 52/0251
See application file for complete search history.

(56) References Cited

U.S. PATENT DOCUMENTS 5,291,486 A * 3/1994 Koyanagi ............. H04J 3/1605
370/397
6,259,693 B1 * 7/2001 Ganmukhi ............ H04L 49/255
370/366

(Continued)

OTHER PUBLICATIONS

Office Action in U.S. Appl. No. 14/831,438 dated Mar. 24, 2017, 11 pages.

(Continued)

*Primary Examiner* — Parth Patel
(74) *Attorney, Agent, or Firm* — Meyertons, Hood, Kivlin, Kowert & Goetzel, P.C.

(57) ABSTRACT

Techniques are disclosed relating to a split communications fabric topology. In some embodiments, an apparatus includes a communications fabric structure with multiple fabric units. The fabric units may be configured to arbitrate among control packets of different messages. In some embodiments, a processing element is configured to generate a message that includes a control packet and one or more data packets. In some embodiments, the processing element is configured to transmit the control packet to a destination processing element (e.g., a memory controller) via the communications fabric structure and transmit the data packets to a data buffer. In some embodiments, the destination processing element is configured to retrieve the data packets from the data buffer in response to receiving the control packet via the hierarchical fabric structure. In these embodiments, bypassing the fabric structure for data packets may reduce power consumption.

20 Claims, 6 Drawing Sheets

(56) References Cited

U.S. PATENT DOCUMENTS

| | | | | |
|---|---|---|---|---|
| 6,950,438 B1* | 9/2005 | Owen | H04L 69/12 | 370/409 |
| 7,221,678 B1* | 5/2007 | Hughes | H04L 47/6285 | 370/401 |
| 7,274,692 B1* | 9/2007 | Hughes | H04L 47/10 | 370/389 |
| 7,286,532 B1* | 10/2007 | Rachepalli | H04L 12/66 | 370/389 |
| 7,376,765 B2* | 5/2008 | Rangan | G06F 3/0613 | 710/38 |
| 7,412,588 B2* | 8/2008 | Georgiou | G06F 15/167 | 710/306 |
| 7,486,678 B1* | 2/2009 | Devanagondi | H04L 49/3072 | 370/394 |
| 7,643,334 B1* | 1/2010 | Lee | G11C 7/22 | 365/163 |
| 7,774,374 B1* | 8/2010 | Kizhepat | H04L 49/101 | 707/800 |
| 7,836,229 B1* | 11/2010 | Singh | G06F 9/5016 | 710/52 |
| 8,270,401 B1* | 9/2012 | Barnes | H04L 12/66 | 370/389 |
| 8,392,575 B1* | 3/2013 | Marr | G06F 9/5061 | 370/252 |
| 8,527,661 B1* | 9/2013 | Lee | H04L 67/1097 | 709/217 |
| 8,532,119 B2* | 9/2013 | Snively | H04L 45/00 | 370/389 |
| 8,792,511 B2* | 7/2014 | Raikar | H04L 49/9005 | 370/412 |
| 9,191,139 B1* | 11/2015 | Venkata | H04J 11/00 | |
| 2002/0141427 A1* | 10/2002 | McAlpine | H04L 47/39 | 370/413 |
| 2006/0161733 A1* | 7/2006 | Beckett | G06F 13/4059 | 711/118 |
| 2007/0086428 A1* | 4/2007 | Lai | H04L 49/103 | 370/351 |
| 2008/0080261 A1* | 4/2008 | Shaeffer | G11C 5/025 | 365/189.05 |
| 2008/0147937 A1* | 6/2008 | Freimuth | G06F 13/4022 | 710/104 |
| 2008/0147938 A1* | 6/2008 | Freimuth | G06F 13/1652 | 710/105 |
| 2008/0147959 A1* | 6/2008 | Freimuth | G06F 12/1009 | 711/100 |
| 2009/0094406 A1* | 4/2009 | Ashwood | G06F 13/404 | 711/103 |
| 2009/0187795 A1* | 7/2009 | Doverspike | H04L 43/02 | 714/43 |
| 2010/0158005 A1* | 6/2010 | Mukhopadhyay | H04L 49/109 | 370/392 |
| 2010/0162265 A1* | 6/2010 | Heddes | G06F 9/542 | 719/314 |
| 2010/0229005 A1* | 9/2010 | Herman | G06F 12/1408 | 713/193 |
| 2011/0158247 A1* | 6/2011 | Toyoshima | H04L 49/109 | 370/401 |
| 2011/0249181 A1* | 10/2011 | Iwami | H04N 21/242 | 348/501 |
| 2011/0252265 A1* | 10/2011 | Iwami | H04N 19/645 | 713/401 |
| 2012/0044813 A1* | 2/2012 | Nandagopal | H04L 45/28 | 370/242 |
| 2012/0144063 A1* | 6/2012 | Menchaca | H04L 47/2475 | 709/240 |
| 2013/0028256 A1* | 1/2013 | Koren | H04L 47/122 | 370/392 |
| 2013/0285998 A1* | 10/2013 | Hong | G06F 3/038 | 345/212 |
| 2014/0122771 A1* | 5/2014 | Chrysos | G06F 13/36 | 710/317 |
| 2014/0372607 A1* | 12/2014 | Gladwin | H04L 67/16 | 709/224 |
| 2015/0227738 A1* | 8/2015 | Katoh | G09C 1/00 | 713/168 |
| 2016/0266898 A1* | 9/2016 | Kitamura | G06F 9/3001 | |
| 2016/0328348 A1* | 11/2016 | Iba | G06F 9/5077 | |
| 2016/0380895 A1* | 12/2016 | Xiong | H04L 12/24 | 370/231 |
| 2017/0055218 A1* | 2/2017 | Fukami | H04W 52/0251 | |
| 2018/0077649 A1* | 3/2018 | Fukami | H04L 47/2466 | |

OTHER PUBLICATIONS

Office Action in U.S. Appl. No. 14/831,438 dated Jul. 20, 2017, 18 pages.

* cited by examiner

COMMUNICATIONS FABRIC WITH SPLIT PATHS FOR CONTROL AND DATA PACKETS

The present application is a continuation of U.S. application Ser. No. 14/831,438, filed Aug. 20, 2015; the disclosure of which is incorporated by reference herein in its entirety.

BACKGROUND

Technical Field

This disclosure relates generally to communications fabrics and more particularly to communications fabrics between processing elements.

Description of the Related Art

Many communications fabrics use a system of interconnected fabric units to arbitrate, aggregate, and/or route packets of messages between different processing elements. For example, some fabrics may use a hierarchical tree structure and process messages at each level in the tree. The processing performed at each level may include arbitration among packets from different processing elements, aggregating of packets belonging to the same message, operations to maintain memory coherency, etc. The processing at each level may be based on control packets in a given message. Other packets of a message, however, may not include information that is relevant to such processing. For example, some packets may include only a data payload.

Communications fabrics are often used in system-on-a-chip (SoC) designs that are often used in mobile devices such as cellular phones, wearable devices, etc., where power consumption is an important design concern.

SUMMARY

Techniques are disclosed relating to a split communications fabric topology.

In some embodiments, an apparatus includes a communications fabric structure with multiple fabric units. The fabric units may be circuitry configured to arbitrate among control packets of different messages. In some embodiments, a processing element is configured to generate a message that includes a control packet and one or more data packets. In some embodiments, the processing element is configured to transmit the control packet to a destination processing element (e.g., a memory controller) via the communications fabric structure and transmit the data packets to a data buffer. In some embodiments, the destination processing element is configured to retrieve the data packets from the data buffer in response to receiving the control packet via the hierarchical fabric structure. In these embodiments, the avoidance of transmitting data packets through multiple hops via the fabric structure may reduce power consumption. The disclosed techniques may be used for programmable I/O messages in some embodiments, while in other embodiments, programmable I/O messages may be transmitted via a separate, dedicated fabric.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 1:
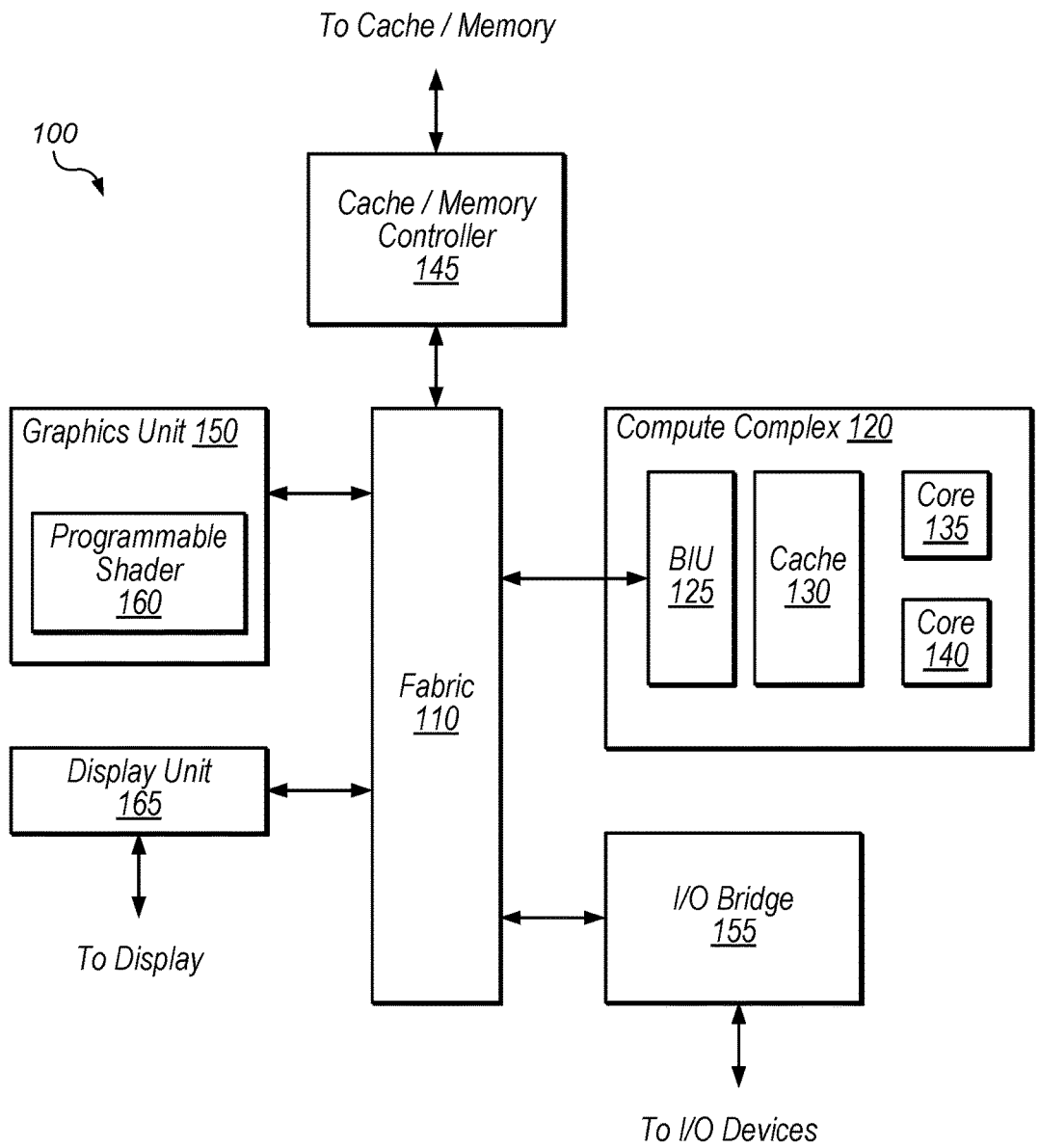
FIG. 1 is a block diagram illustrating a device that includes a communications fabric, according to some embodiments.
Figure 4:
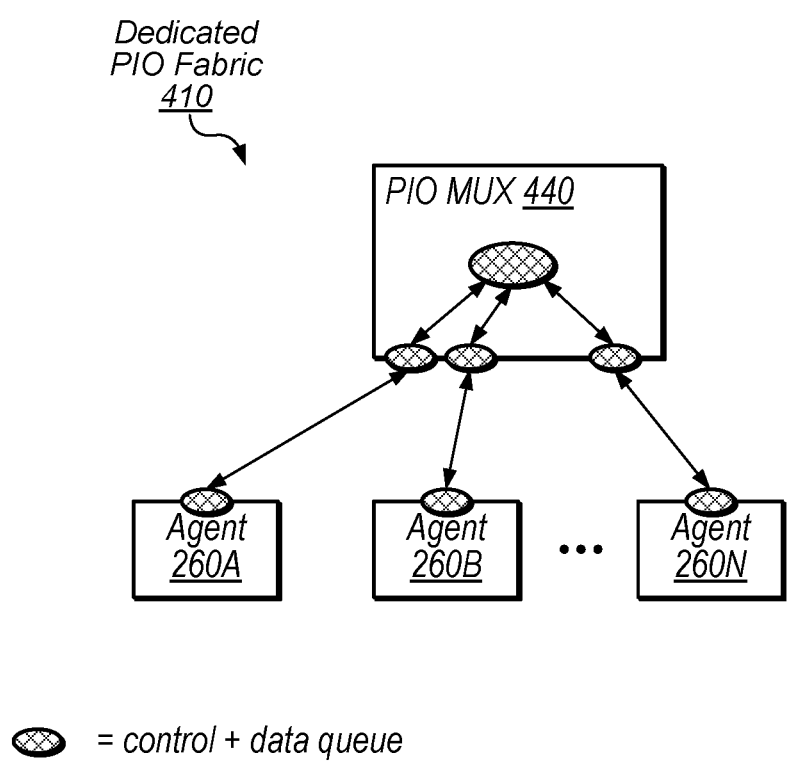
FIG. 4 is a block diagram illustrating a dedicated PIO fabric, according to some embodiments.
Figure 5:
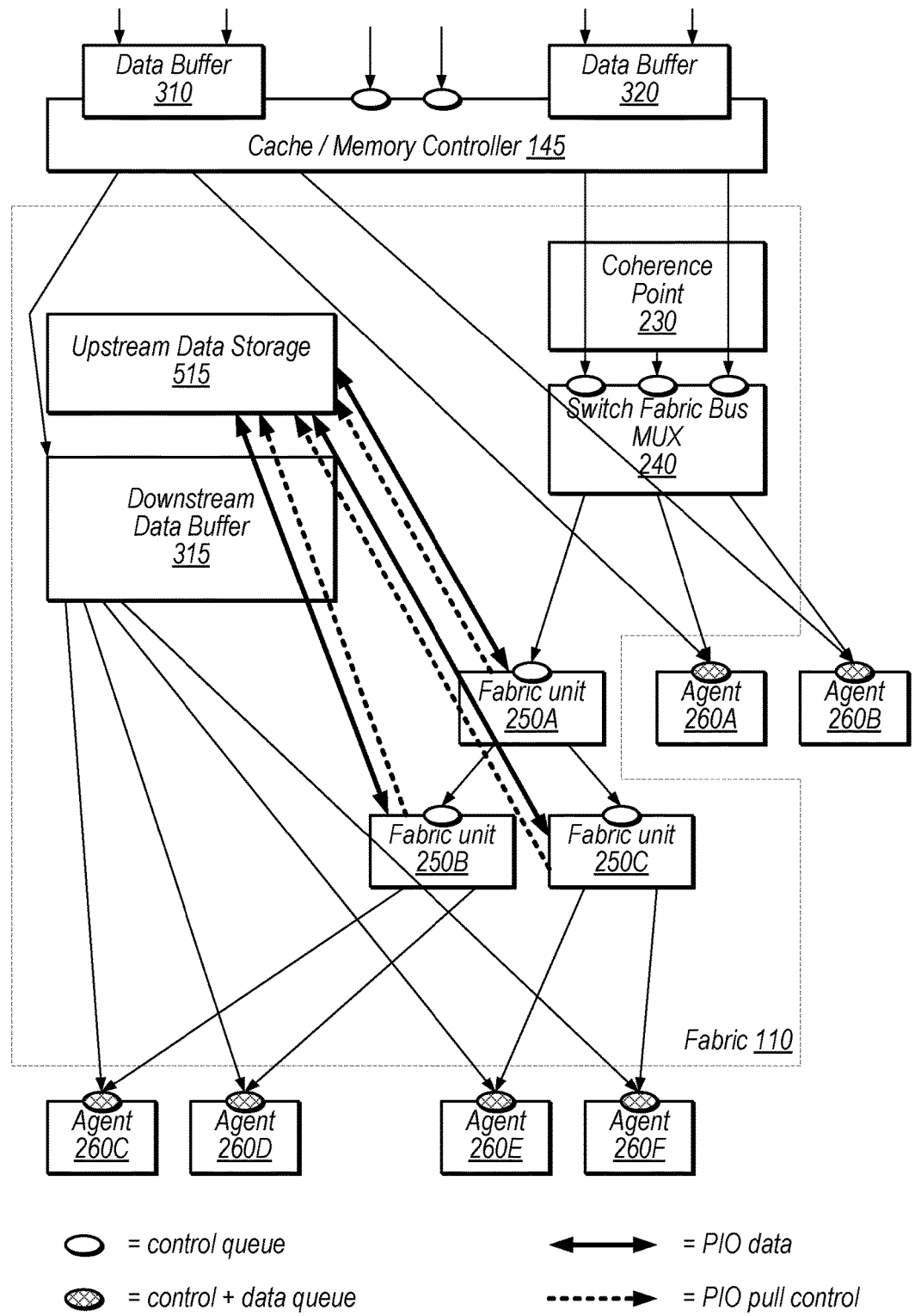
FIG. 5 is a block diagram illustrating a fabric with split paths for PIO control and data packets.
Figure 6:
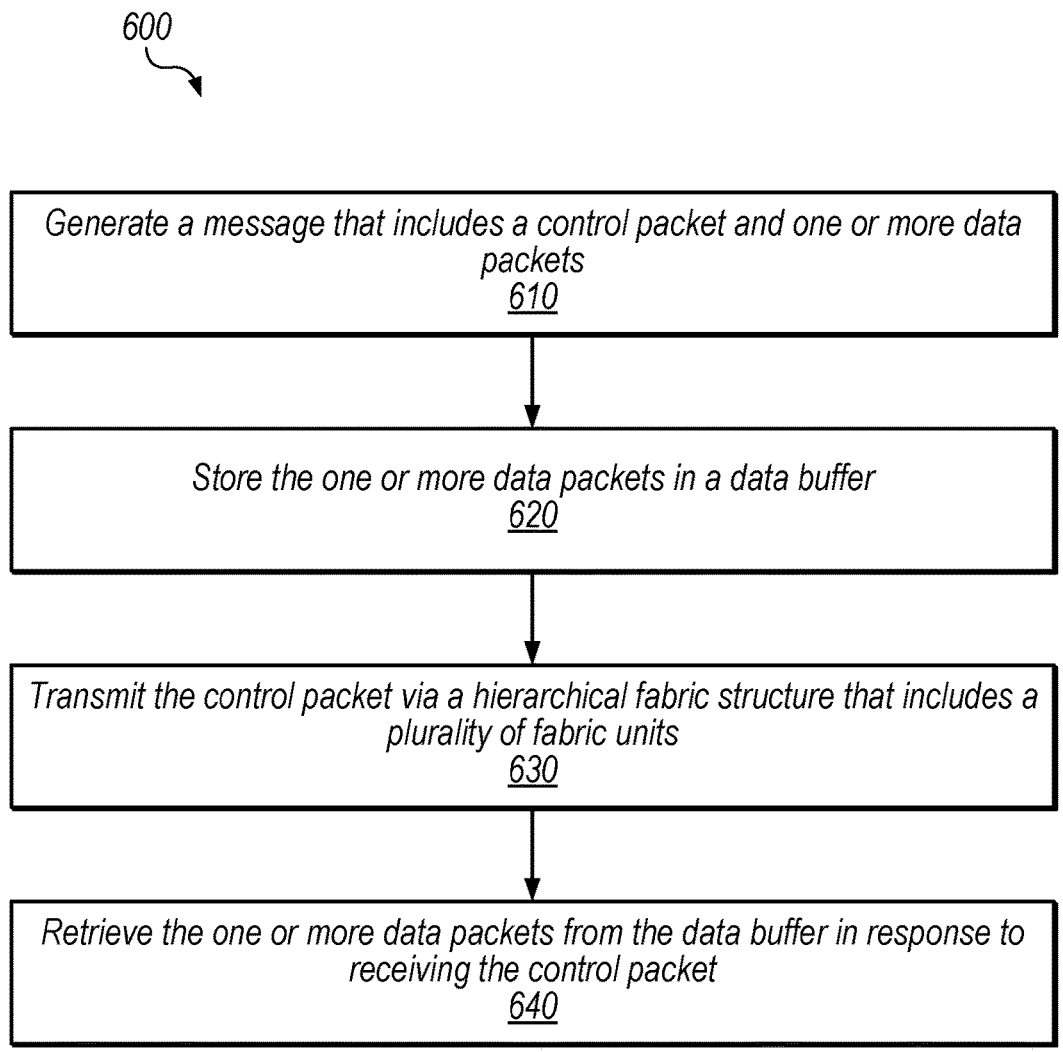
FIG. 6 is a flow diagram illustrating a method for using a fabric with a split topology, according to some embodiments.

This disclosure initially describes, with reference to FIG. 1, an overview of a system that includes multiple processing elements coupled via a communications fabric. Exemplary embodiments of a fabric topology with split paths for data packets and control packets are discussed with reference to FIGS. 2-3, while FIGS. 4-5 illustrate different programmable I/O implementations. FIG. 6 illustrates an exemplary method. The disclosed techniques may reduce dynamic power consumption associated with transferring data packets using a communications fabric, in some embodiments.

Exemplary Device

Referring now to FIG. 1, a block diagram illustrating an exemplary embodiment of a device 100 that includes a communications fabric 110 is shown. In some embodiments, elements of device 100 may be included within a system on a chip, e.g., on a single integrated circuit. In some embodiments, device 100 may be included in a mobile device, which may be battery-powered. Therefore, power consumption by device 100 may be an important design consideration. In the illustrated embodiment, device 100 includes fabric 110, compute complex 120, input/output (I/O) bridge 150, cache/memory (CM) controller 145, graphics unit 150, and display unit 165.

Fabric 110 may include various interconnects, buses, muxes, controllers, etc., and may be configured to facilitate communication between various elements of device 100. In some embodiments, portions of fabric 110 may be configured to implement multiple different communication protocols. In other embodiments, fabric 110 may implement a single communication protocol and elements coupled to fabric 110 may convert from the single communication protocol to other communication protocols internally.

Figure 2:
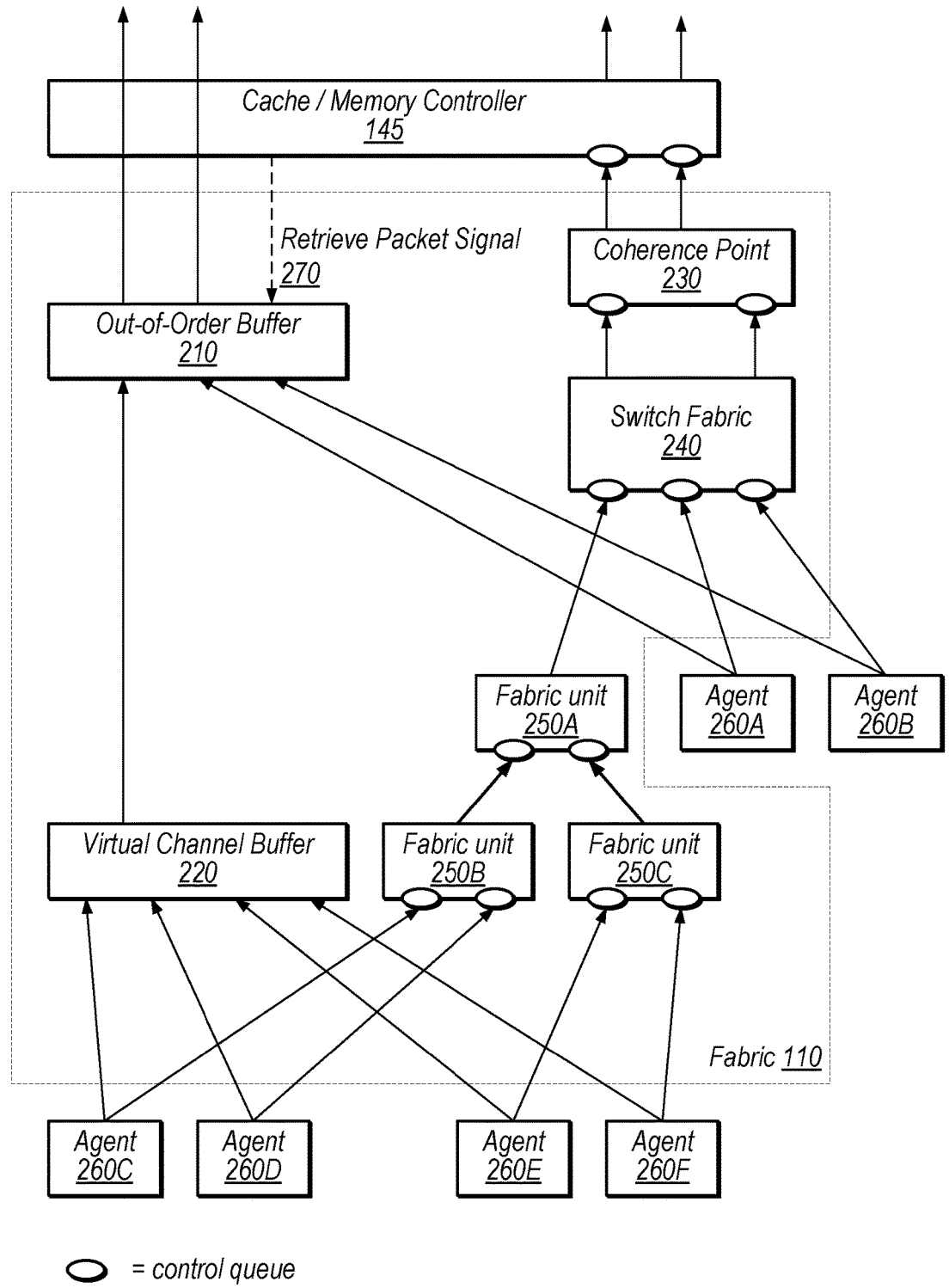
FIG. 2 is a block diagram illustrating an exemplary hierarchical fabric with split paths for upstream control packets and data packets, according to some embodiments.

Fabric 110 may include a plurality of "fabric units." This term refers to circuitry configured to arbitrate among packets from multiple sources and/or for multiple destinations, where the packets are transmitted via a communications fabric. For example, each fabric unit may be configured to receive packets from multiple sources and determine which packets to transmit to another fabric unit or another processing element. Each fabric unit may also be configured to receive packets from one or more sources and route the packets to multiple different destinations. Thus, fabric units may also be referred to as fabric circuitry or bus multiplexers. In some embodiments, fabric 110 is implemented as a hierarchical tree structure. A "hierarchical" structure refers to a structure with multiple levels of fabric units, such that at least a subset of packets transmitted via the structure travel up or down the hierarchy for multiple levels of fabric units before reaching their destination. For example, referring briefly to FIG. 2, fabric unit 250A is at a different level in a hierarchical fabric than fabric units 250B and 250C. Note that some processing elements may couple to a hierarchical fabric in the middle of the fabric rather than at an upper or lower boundary of the fabric, e.g., as shown in FIG. 2. A "tree" structure refers to a hierarchical structure with a root node, such that packets transmitted upwards from any fabric unit in the tree eventually arrive at the root node. In a tree structure, packets from multiple sources are often merged at a particular level in a hierarchical fabric. In some embodiments, fabric 110 is configured to process messages from various processing elements of system 100, which may include packet arbitration, aggregation, routing, etc.

In the illustrated embodiment, compute complex 120 includes bus interface unit (BIU) 125, cache 130, and cores 135 and 140. In various embodiments, compute complex 120 may include various numbers of processors, processor cores and/or caches. For example, compute complex 120 may include 1, 2, 4, 6 or 8 processor cores, or any other suitable number. In one embodiment, cache 130 is a set associative L2 cache. In some embodiments, cores 135 and/or 140 may include internal instruction and/or data caches. In some embodiments, a coherency unit (not shown in FIG. 1) in fabric 110, cache 130, or elsewhere in device 100 may be configured to maintain coherency between various caches of device 100. BIU 125 may be configured to manage communication between compute complex 120 and other elements of device 100. Processor cores such as cores 135 and 140 may be configured to execute instructions of a particular instruction set architecture (ISA) which may include operating system instructions and user application instructions.

CM controller 145 may be configured to manage transfer of data between fabric 110 and one or more caches and/or memories. For example, CM controller 145 may be coupled to a level 3 (L3) cache, which may in turn be coupled to a system memory. In other embodiments, CM controller 145 may be directly coupled to a memory. In some embodiments, CM controller 145 may include one or more internal caches.

As used herein, the term "coupled to" may indicate one or more connections between elements, and a coupling may include intervening elements. For example, in FIG. 1, graphics unit 150 may be described as "coupled to" a memory through fabric 110 and CM controller 145. In contrast, in the illustrated embodiment of FIG. 1, graphics unit 150 is "directly coupled" to fabric 110 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 165 may be configured to read data from a frame buffer and provide a stream of pixel values for display. Display unit 165 may be configured as a display pipeline in some embodiments. Additionally, display unit 165 may be configured to blend multiple frames to produce an output frame. Further, display unit 165 may include one or more interfaces (e.g., MIPI® or embedded display port (eDP)) for coupling to a user display (e.g., a touchscreen or an external display).

I/O bridge 150 may include various elements configured to implement: universal serial bus (USB) communications, security, audio, and/or low-power always-on functionality, for example. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to device 100 via I/O bridge 150.

FIG. 1 illustrates the need for efficient communications between processing elements in various systems. For example, various elements of system 100 may utilize fabric 110 to access memory, transmit data to other elements, communicate with I/O devices etc.

Exemplary Split Fabric Implementation

FIG. 2 is a block diagram illustrating an exemplary hierarchical fabric with split paths for upstream control packets and data packets, according to some embodiments. In the illustrated embodiment, fabric 110 is arranged using a tree structure. In the illustrated embodiment, fabric 110 is coupled to CM controller 145 and agents 260A-N and includes out-of-order (OOO) buffer 210, virtual channel (VC) buffer 220, coherence point 230, switch fabric (SF) 240, and fabric units 250A-N.

In other embodiments, fabric 110 may be coupled to and/or include various elements in addition to and/or in place of those shown. In the illustrated embodiment, fabric 110 is arranged as a hierarchical tree structure in which two or more paths converge at each level of the structure. In other embodiments, any of various appropriate fabric topologies may be implemented. The embodiments of fabric 110 in FIGS. 2-3 and 5 herein are included for illustrative purposes and is not intended to limit the scope of the present disclosure.

Agents 260 may correspond to various ones of processing elements of FIG. 1, in some embodiments, such as display unit 165, I/O bridge 155, compute complex 120, etc. An "agent" refers to a processing element that is configured to access memory and/or communicate with another agent via a communications fabric. In various embodiments, agents 260 are configured to generate messages that include one or more control packets and one or more data packets. These may include programmable IO (PIO) messages (which may be routed by compute complex 120 between various agents) and messages to CM controller 145, e.g., to access system memory. The term "control packet" is intended to be used according to its well-known meaning, which includes packets with information needed to route data packets, such as destination addresses, error detection and/or correction codes, source information, etc. The term "data packet" is also intended to include its well-known meaning, which may include any of various types of information being transferred, to be delivered to a receiving processing element. The data packets in a message may also be referred to as its "payload."

Fabric 110, in the illustrated embodiment, is configured with split paths for control packets and data packets. In the illustrated embodiment, agents 260 are configured to transmit data packets to VC buffer 220 and/or OOO buffer 210. In the illustrated embodiment, agents 260 are configured to transmit control packets via fabric units 250, SF 240, and coherence point 230.

SF 240 and coherence point 230 may also be referred to as fabric units and may be configured similarly to fabric units 250, but may also perform additional functions in some embodiments. For example, SF 240 may be the largest fabric units in fabric 110 and may be directly coupled to compute complex 120 while coherence point 230 may be configured to maintain memory coherence among various cache and/or memory structures of system 100. As used herein, the term "coherence point" is intended to be construed according to its well-known meaning, which includes a processing element configured to maintain cache coherence between caches and/or memories in a shared memory system. In some embodiments, coherence point 230 is configured to make final decisions regarding the ordering of packets released to CM controller 145.

In some embodiments, the various fabric units (which may also be referred to as bus multiplexers or fabric circuitry) of FIG. 2 are configured to aggregate control packets for a given message. For example, some control packets may lag and each fabric units may be configured to wait for all control packets before transmitting the control packets to the next level in the hierarchy. In some embodiments, the various fabric units of FIG. 2 are configured to arbitrate between received control packets to determine what packets to transmit first. In some embodiments, fabric units are configured to implement multi-level round robin scheduling. In some embodiments, fabric units are configured to meet particular quality of service (QoS) constraints. Each fabric unit may be configured to communicate with a plurality of agents. In the illustrated embodiment, each fabric unit includes one or more control queues configured to store control packets until they are allowed to proceed through the fabric. A fabric unit may be used at each node in the fabric where packets can fork to multiple destinations and/or be received from multiple destinations.

In some embodiments, fabric 110 may include a single upstream data buffer, and/or a single data buffer for both upstream and downstream communications. In the illustrated embodiment, however, fabric 110 includes two upstream data buffers, OOO buffer 210 and VC buffer 220. In some embodiments, the VC buffer 220 is configured to maintain order among virtual channels while OOO buffer 210 is not configured to order stored data. In some embodiments, sets of processing elements are assigned to virtual channels. A "virtual channel" refers to a grouping of one or more processing elements (or portions thereof) among which messages must be transmitted in the order they are received. For example, if processing element A uses a virtual channel to transmit a message at time X and processing element B uses the virtual channel to transmit a message at time X+1, then the message from processing element A should be transmitted before the message from processing element B. In contrast, messages belonging to different virtual channels may be transmitted out-of-order with respect to each other. Thus, if processing elements A and B were to transmit the same messages using different virtual channels, the ordering of the messages would not matter. In some embodiments, agents 260 may be assigned to fixed virtual channels (e.g., agents 260C and 260D may be assigned to the same virtual channel and may communicate using fabric 110 only via that channel).

In the illustrated embodiment, agents 260 that share a virtual channel with other agents (e.g., agents 260C-260F) are configured to utilize VC buffer 220 for data prior to sending the data to OOO buffer 210. VC buffer may enforce ordering among data within a given virtual channel. In the illustrated embodiment, agents that do not share a virtual channel with other agents (e.g., Agents 260A-260B) are configured to send data packets directly to OOO buffer 210.

In some embodiments, VC buffer 220 may include one or more of the following features: multiple input ports, multiple output ports, a logical/physical channel per virtual channel per agent, an in-order buffer per virtual channel, asynchronous clock crossing, upsizing of data, and/or a credit interface. In some embodiments OOO buffer 210 may include one or more of the following features: multiple input ports, multiple output ports, out-of-order storage, and/or a credit interface.

In the illustrated embodiment, when a control packet (or set of control packets) for a message eventually arrives at CM controller 145, it is configured to assert a retrieve packet signal 270 to OOO buffer 210 and retrieve the corresponding data packet(s). In some embodiments, the retrieve packet signal includes at least a portion of the control packet(s), such as a command, a virtual channel, and/or an identifier associated with the control packet(s).

Consider, for example, a message originating at agent 260D. Agent 260D may transmit one or more control packets for the message to CM controller 145 via fabric unit 250B, fabric unit 250A, SF 240, and coherence point 230. Agent 260E may also transmit one or more data packets for the message to VC buffer 220, which may transmit the data packets to OOO buffer 210 after resolving any ordering issues within the virtual channel corresponding to agent 260D. In this example, CM controller 145 may retrieve the data packets from OOO buffer 210 (e.g., using signal 270) in response to receiving the one or more control packets from coherence point 230.

In some embodiments, the illustrated split topology may substantially reduce dynamic power consumption relative to transmitting control packets and data packets via the same path. For example, queueing data packets at each fabric unit in the tree from an agent to CM controller 145 would consume considerable power relative to storing the data packets in buffers 210 and/or 220 while corresponding control packet(s) are processed. Further, the illustrated split topology may allow existing processing techniques for control packets to remain unchanged. Thus, in some embodiments, the interface of each agent to fabric 110 may remain unchanged relative to prior fabric implementations.

Figure 3:
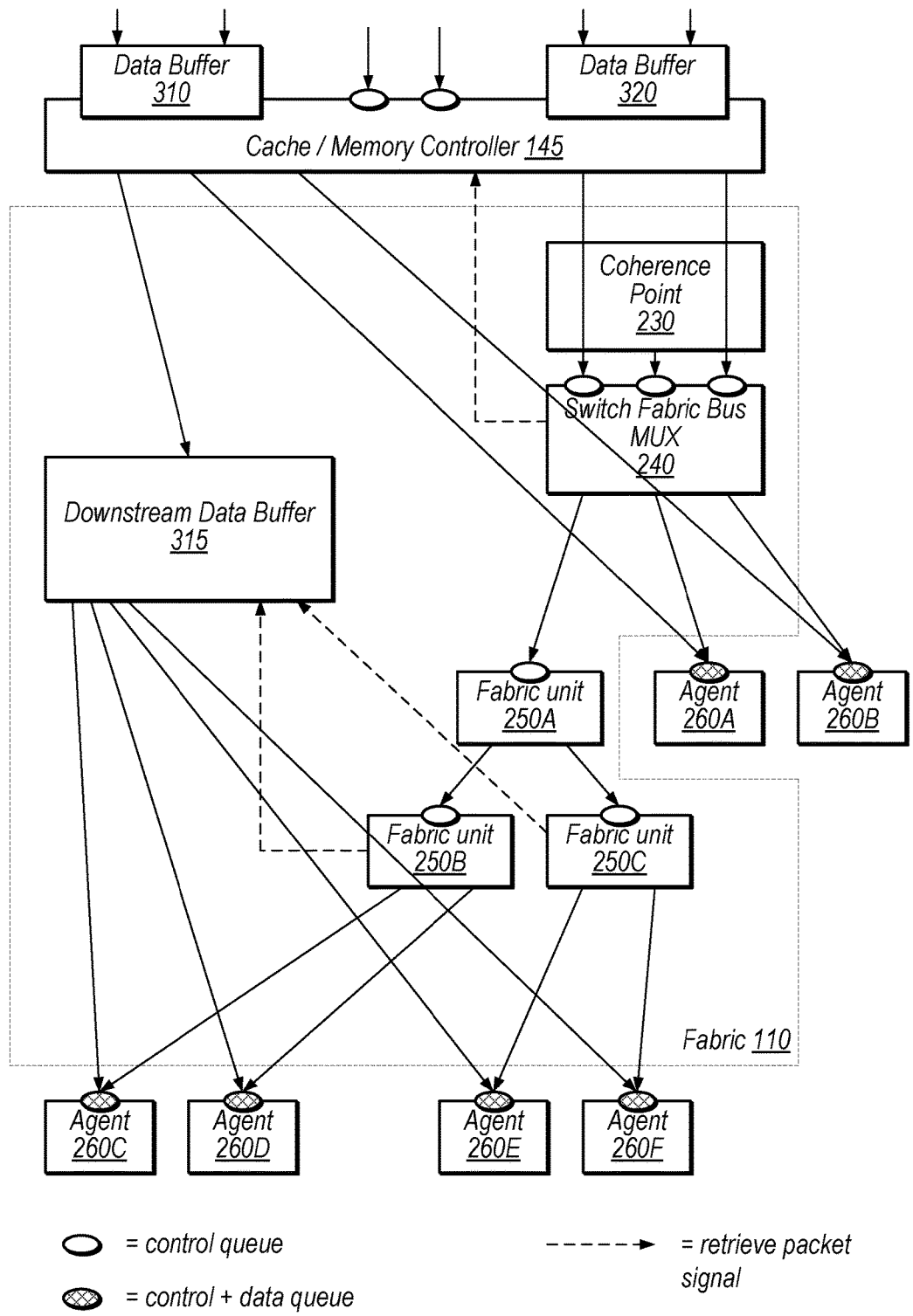
FIG. 3 is a block diagram illustrating an exemplary hierarchical fabric with split paths for downstream control packets and data packets, according to some embodiments.

FIG. 3 is a block diagram illustrating an exemplary hierarchical fabric with split paths for downstream control packets and data packets, according to some embodiments. Elements with similar reference numbers to those in FIG. 2 may be configured as described above with reference to FIG.

2. In the illustrated embodiment, fabric 110 also includes data buffers 310 and 320 and downstream data buffer 315, in addition to the elements shown in FIG. 2.

Data buffers 310 and 320, in the illustrated embodiment, are configured to store data retrieved from memory until the data is released by CM controller 145. Although memory responses may not use coherence point 230, in some embodiments snoop requests are processed by coherence point 230. SF 240 may be configured to decide what responses to return for at least a portion of the fabric, e.g., based on credits assigned to different agents in order to arbitrate among the agents and avoid locking out a particular agent. Various techniques for assigning credits to different processing elements are known to those of skill in the art. For example, each agent may be assigned a particular number of credits and each message, message portion, packet, (or message data at any of various appropriate granularities, in various embodiments) may require a credit for transmission. In this example, the credit(s) used to transmit a message may be returned to the agent as the message is completed, allowing the agent to send additional messages. Data buffers 310 and 320 and downstream data buffer 315, in some embodiments, include the following features: multiple input ports, multiple output ports, a logical/physical channel per destination, asynchronous clock crossing, data downsizing, and/or a credit interface.

In the illustrated embodiment, CM controller 145 transmits control packets via the fabric units (e.g., SF 240 and/or ones of fabric units 250) to the appropriate agent. In the illustrated embodiment, CM controller 145 maintains corresponding data packets in data buffer 310 and/or data buffer 320, or transmits the corresponding data packets to downstream data buffer 315. When the agent receives the control packet(s), it is configured to assert a retrieve packet signal (which may include a portion of the control packet as discussed above) via its nearest fabric unit and receives corresponding data packets from data buffer 310, data buffer 320, and/or downstream data buffer 315, in some embodiments. Thus, in the illustrated embodiment, agents 260C each include or are coupled to a queue for storing both control and data packets.

Exemplary Programmable I/O Implementations

FIG. 4 is a block diagram illustrating a dedicated PIO fabric 410, according to some embodiments. PIO traffic data may proceed upstream from an initiating agent, in some embodiments, until it reaches compute complex 120 (e.g., via SF 240), which may determine that the data is addressed to another agent rather than to memory. PIO message then may be routed to the destination agent. In the embodiment of FIG. 4, PIO traffic uses a separate fabric or fabric portion from non-PIO traffic (e.g., memory traffic that is handled by CM controller 145). In some embodiments, the PIO fabric is a packetized bus that allows data and control packets to travel on the same physical bus with a narrower bus width, relative to fabric 110. The PIO fabric may be "dedicated" in the sense that it does not share wires or fabric units with other fabrics such as fabric 110. Thus, in embodiments with a dedicated PIO fabric, the PIO fabric does not transmit control packets or data packets for non-PIO messages.

In the illustrated embodiment, PIO mux 440 includes multiple control and data queues configured to aggregate and/or arbitrate for both control and data packets for various agents 260A-N. In the illustrated embodiment, communications via PIO mux 440 occur separately from communications via fabric 110.

Having a separate dedicated fabric may allow for more predictable PIO performance (e.g., by reducing interference between memory traffic and PIO traffic because the fabric is not shared with memory traffic) and/or allow separation of the clock and power state of PIO fabric 410 from the clock and power state of fabric 110. Separate fabrics may, however, increase area and/or power consumption, require additional logic for ordering, and/or increase top-level wiring relative to re-using at least a portion of fabric 410 for PIO traffic.

FIG. 5 is a block diagram illustrating an exemplary hierarchical fabric in which PIO is overlaid on the main fabric. Elements with similar reference numbers to those in FIG. 3 may be configured as described above with reference to FIG. 3. In the illustrated embodiment, fabric 110 also includes upstream data storage 515. In some embodiments, upstream data storage 515 corresponds to VC buffer 220 and/or OOO buffer 210, while in other embodiments a separate upstream buffer may be included to PIO.

In the illustrated embodiment, PIO control packets are transmitted via the control portion of fabric 110 as discussed above with reference to FIGS. 2-3 but the PIO data (both request data and response data in some embodiments), is stored in upstream data storage 515. In the illustrated embodiment, agents 260 are configured to assert PIO pull control signals via a nearby fabric unit 250 in response to receiving a PIO control packet, to retrieve corresponding PIO data from upstream data storage 515.

In some embodiments, overlaying PIO traffic on the split fabric 110 may reduce power consumption, for at least the reasons discussed above with reference to FIGS. 2 and 3, and may also reduce processor area by re-using communications resources. The embodiment of FIG. 5 may also allow higher bandwidth relative to the embodiment of FIG. 4 for PIO. The embodiment of FIG. 5, however, may generally result in more interference between PIO traffic and memory traffic and a larger amount of control storage relative to the embodiment of FIG. 4.

In some embodiments, PIO data may be routed partially via a dedicated fabric and partially using fabric 110. For example, the embodiments of FIGS. 4 and 5 may be implemented separately or may be at least partially combined. For example, in these embodiments, agents may select whether to send PIO data via a dedicated fabric or fabric 110.

Exemplary Method

FIG. 6 is a flow diagram illustrating a method 600 for using a split fabric, according to some embodiments. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, a processing element generates a message that includes a control packet and one or more data packets. The control packet may include one or more commands or instructions for a destination processing element. In some embodiments, the destination processing element is CM controller 145. In other embodiments, the destination processing element may be specified using PIO. The control packet may be one of multiple control packets included in the message.

At 620, the processing element stores one or more data packets in a data buffer. For example, referring to FIG. 2, agent 260E may store data packets in VC buffer 220 and/or OOO buffer 210. In some embodiments, the processing element may simply transmit the data packets to the fabric, without controlling how or where they should be stored, and fabric 110 is configured to control storage of the data packets in the data buffer.

At 630, the control packet is transmitted via a hierarchical fabric structure that includes a plurality of fabric units. For example, referring to FIG. 2, Agent 260E may transfer the control packet to CM controller 145 via fabric units 250C, 250A, and 240. The fabric structure may aggregate control packets and/or arbitrate among control packets from different processing elements. The fabric structure may route the control packet to a destination processing element, e.g., based on information in the control packet. In other embodiments, e.g., when the fabric uses a tree structure, the fabric units may simply pass control packets to the next level of the fabric after arbitration.

At 640, the destination processing element retrieves the one or more data packets from the data buffer (e.g., using a pull signal) in response to receiving the control packet. Storing the data packets in the data buffer rather than sending them through the fabric structure with the control packet may substantially reduce dynamic power consumption, in some embodiments.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a communications fabric that includes a plurality of fabric units;
   a memory controller coupled to the communications fabric;
   a first data buffer and a second data buffer; and
   a processing element configured to:
      generate a message that includes a control packet and one or more data packets;
      transmit the control packet via the communications fabric to the memory controller using multiple ones of the fabric units; and
      store the one or more data packets in the first data buffer, bypassing the multiple ones of the fabric units;
   wherein the memory controller is configured to:
      in response to the control packet arriving at the memory controller, retrieve the one or more data packets from the first data buffer;
      generate a second message that includes a second control packet and second one or more data packets;
      store the one or more data packets in the second data buffer; and
      transmit the second control packet via the communications fabric to the processing element; and
   wherein the processing element is configured to retrieve the second one or more data packets from the second data buffer in response to receiving the second control packet.

2. The apparatus of claim 1, wherein the apparatus is configured to:
   store data packets for programmable input/output (PIO) messages in an upstream data buffer; and
   retrieve data packets from the upstream data buffer and provide the data packets to a destination processing element, in response to receiving a control packet that corresponds to the data packets via the communications fabric.

3. The apparatus of claim 1, further comprising:
   a dedicated second communications fabric for PIO messages.

4. The apparatus of claim 1, wherein the communications fabric is arranged as a tree structure.

5. The apparatus of claim 1, wherein the first data buffer is configured to enforce ordering among at least a portion of received data packets and wherein the apparatus includes another upstream data buffer that is not configured to enforce ordering among received data packets.

6. The apparatus of claim 5, wherein the apparatus is configured to use the first data buffer for processing elements that share a virtual channel.

7. The apparatus of claim 1, wherein the fabric units are configured to:
   arbitrate between control packets from multiple different processing elements; and
   aggregate control packets for messages that include multiple control packets.

8. A method, comprising:
   generating, by a processing element, a message that includes a control packet and one or more data packets;
   transmitting, by the processing element, the control packet via a communications fabric to a memory controller using multiple fabric units included in a fabric structure of the communications fabric;
   storing, by the processing element, the one or more data packets in a first data buffer, without using the multiple fabric units;
   in response to the control packet arriving at the memory controller, the memory controller retrieving the one or more data packets from the first data buffer;
   generating, by the memory controller, a second message that includes a second control packet and second one or more data packets;
   storing, by the memory controller, the one or more data packets in a second data buffer;
   transmitting, by the memory controller, the second control packet via the communications fabric to the processing element; and
   retrieving, by the processing element, the second one or more data packets from the second data buffer in response to receiving the second control packet.

9. The method of claim 8, wherein the processing element is included in a system-on-a-chip integrated circuit that includes multiple other processing elements, the method further comprising communicating, by the processing element with other processing elements via the fabric structure.

10. The method of claim 8, further comprising determining whether to store the one or more data packets in a first data buffer or a second data buffer based on whether a processing element that generated the one or more data packets shares a channel with other processing elements.

11. The method of claim 8, further comprising:
arbitrating, by ones of the fabric units, between the control packet and one or more additional control packets.

12. The method of claim 11, wherein the arbitrating is based on one or more virtual channels assigned to the control packet and the one or more additional control packets.

13. The method of claim 8, further comprising:
aggregating, by ones of the fabric units, a plurality of control packets for a given message before transmitting the plurality of control packets.

14. The method of claim 8, further comprising:
processing and enforcing coherence, by one of the fabric units, for all control packets transmitted across the fabric structure.

15. A system, comprising:
a communications fabric that includes a plurality of fabric units;
a memory controller coupled to the communications fabric;
one or more data buffers; and
a processing element configured to:
generate a message that includes a control packet and one or more data packets;
transmit the control packet via the communications fabric to the memory controller using multiple fabric units; and
transmit the one or more data packets to at least one of the one or more data buffers without using the multiple fabric units;
wherein the memory controller is configured to:
in response to the control packet arriving at the memory controller, retrieve the one or more data packets from the at least one of the one or more data buffers;
generate a second message that includes a second control packet and second one or more data packets;
store the one or more data packets in at least one of the one or more data buffers; and
transmit the second control packet via the communications fabric to the processing element; and
wherein the processing element is configured to retrieve the second one or more data packets from the at least one of the one or more data buffers in response to receiving the second control packet.

16. The system of claim 15, wherein ones of the fabric units are configured to:
arbitrate between control packets from multiple different processing elements.

17. The system of claim 15, wherein the one or more data buffers include at least one buffer configured to enforce ordering among at least a portion of received data packets and at least one buffer that is not configured to enforce ordering among received data packets.

18. The system of claim 15, wherein the communications fabric is arranged as a hierarchical tree structure.

19. The system of claim 18, wherein the system is configured to use a particular one of the one or more data buffers for processing elements that share a virtual channel.

20. The system of claim 15, wherein ones of the fabric units are configured to aggregate control packets for messages that include multiple control packets.

* * * * *